United States Patent [19]
Kuretake et al.

[11] Patent Number: 5,364,126
[45] Date of Patent: Nov. 15, 1994

[54] SPECIALLY FOLDED AIR BAG AND SPECIAL INFLATOR FOR INFLATING AIR BAG

[75] Inventors: Masato Kuretake; Motonobu Kitagawa; Kazuhiko Yamakawa; Yoshimi Yoshida; Sawayo Uda; Takayasu Zushi, all of Shiga, Japan

[73] Assignee: Takata Corporation, Tokyo, Japan

[21] Appl. No.: 131,963

[22] Filed: Oct. 8, 1993

[30] Foreign Application Priority Data

Oct. 30, 1992 [JP] Japan .................. 4-292920

[51] Int. Cl.⁵ .................. B60R 21/22; B60R 21/26
[52] U.S. Cl. .................. 280/730 R; 280/736; 280/741; 280/728 R; 102/531
[58] Field of Search ............ 280/741, 736, 743 R, 280/730 R, 731, 728 R; 102/530, 531

[56] References Cited

U.S. PATENT DOCUMENTS

| | | | |
|---|---|---|---|
| 3,532,358 | 10/1970 | Selwa et al. | 280/741 |
| 4,235,453 | 11/1980 | Lawson et al. | 280/743 R |
| 4,950,458 | 8/1990 | Cunningham | 280/741 |
| 5,275,435 | 1/1994 | Fischer | 280/743 R |

FOREIGN PATENT DOCUMENTS

| | | | |
|---|---|---|---|
| 4005768 | 8/1991 | Germany | 280/736 |
| 0212147 | 9/1988 | Japan | 280/743 R |
| 2279441 | 11/1990 | Japan | 280/743 R |
| 4368251 | 12/1992 | Japan | 280/743 R |

*Primary Examiner*—Karin L. Tyson
*Assistant Examiner*—Peter C. English
*Attorney, Agent, or Firm*—Kanesaka & Takeuchi

[57] ABSTRACT

An air bag device includes: a retainer having an inflator mounting opening formed in the central portion of its main plate; an inflater having its leading end mounted in the opening of the retainer and formed with a plurality of gas injection ports in its side periphery; an air bag fitted on the retainer and folded such that it can be extended by the gas injected from the inflator; and a module cover covering the air bag and capable of being torn by the air bag when the air bag is extended. The air bag is folded at first in a first direction along the main plate of the retainer and then in a second direction perpendicular to the first direction. The inflator injects the gas in the second direction, immediately after being activated, and then in the first direction.

5 Claims, 5 Drawing Sheets

SPECIALLY FOLDED AIR BAG AND SPECIAL INFLATOR FOR INFLATING AIR BAG

BACKGROUND OF THE INVENTION

1. Field of the Invention

The present invention relates to an air bag device for extending an air bag at the time of a collision of a vehicle to protect an occupant and, particularly, to a device to be mounted in a steering unit and suited as an air bag device for a driver. More particularly, the present invention relates to an air bag device which is improved to have the air bag extended quickly.

2. Description of the Related Art

The air bag device to be mounted in a stationary portion in front of a seat of a vehicle is intended to protect an occupant in an emergency such as a collision, by inflating (or extending) the air bag with pressure of gas injected from a gas generator called an "inflator".

FIG. 10 shows an example of an air bag device for a driver of the prior art. An inflator 14 has a leading end fitted in a central opening (or inflator mounting hole) 12 which is formed in a main plate 10a of a retainer 10.

An air bag 16 is formed with a receiving hole 18 for receiving a leading end of the inflator 14. The receiving hole 18 is arranged around a peripheral edge of the mounting hole 12. The receiving hole 18 of the air bag has a peripheral edge held on the peripheral edge of the mounting hole 12 by a holding ring (or patch) 20.

The air bag 16 and the inflator 14 are fixed on the retainer 10 by fixing stud bolts 38 on the holding ring 20, by inserting the stud bolts 38 into bolt holes of the air bag 16, bolt holes of the retainer 10 and bolt holes formed in a flange of the inflator 14, and by fastening nuts 40 therewith.

The air bag 16 is folded in an extensible state and covered with a module cover 22. The module cover 22 is torn by pressure of inflation of the air bag 16 when the air bag 16 is extended by gas injected from the inflator 14.

The driver's air bag device is preferable for protecting the driver if it could extend the air bag 16 quickly at first in the vertical direction and then in the horizontal direction in front of the driver when the inflator 14 is activated.

OBJECT AND SUMMARY OF THE INVENTION

An object of the present invention is to provide an air bag device which has an air bag quickly extended vertically and horizontally in front of a driver when an inflator is activated.

According to the present invention, there is provided an air bag device which comprises: a retainer having an inflator mounting opening formed in a central portion of its main plate; an inflator having a leading end mounted in the opening of the retainer and formed with a plurality of gas injection ports in its side periphery; an air bag fitted on the retainer and folded such that it can be extended by the gas injected from the inflator; and a module cover covering the air bag for to be torn by the air bag when the air bag is extended. The air bag is folded at first in a first direction along the main plate of the retainer and then in a second direction perpendicular to the first direction. The inflator injects the gas in the second direction, immediately after being activated, and then in the first direction.

In the air bag device thus constructed according to the present invention, the air bag is extended at first in the second direction because it is folded at first in the first direction and then in the second direction. Thus, the inflator injects at first the gas only in the second direction along the main plate of the retainer immediately after it is activated. As a result, the gas injected from the inflator applies its pressure exclusively in the second direction. In other words, the gas pressure is substantially utilized to extend the air bag in the second direction. As a result, the air bag is abruptly extended in the second direction. After the air bag has been extended to its substantial entirety, in the second direction, the inflator in turn injects the gas mainly in the first direction. As a result, the gas pressure of the inflator acts to extend the air bag substantially in the first direction so that the air bag is then abruptly extended in the first direction.

In the air bag device of the present invention, the inflator has its gas injecting direction aligned with the extending direction of the air bag so that the air bag can be extended remarkably quickly. Moreover, most of the injected gas pressure effectively acts to expand the air bag in the extending direction so that the air bag can be extended sufficiently quickly even if the inflator has its capacity reduced.

DESCRIPTION OF THE PREFERRED EMBODIMENTS

An embodiment of the present invention will be described in the following with reference to the accompanying drawings.

Figure 9:
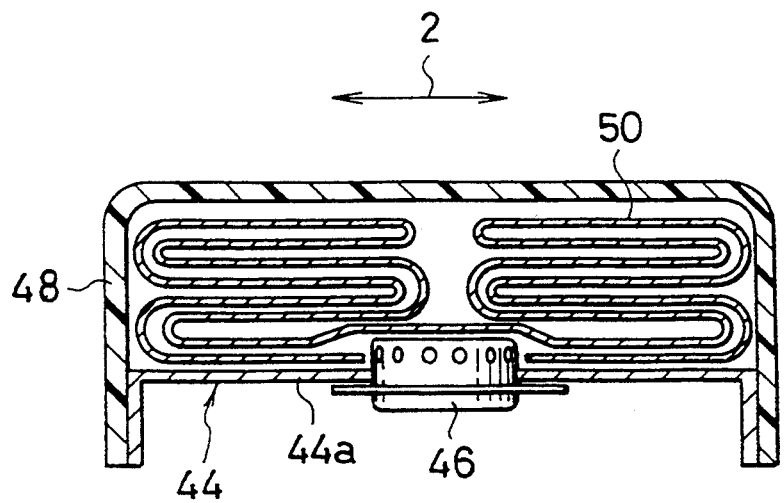
FIG. 9 is a longitudinal section of an air bag device according to an embodiment.
Figure 10:
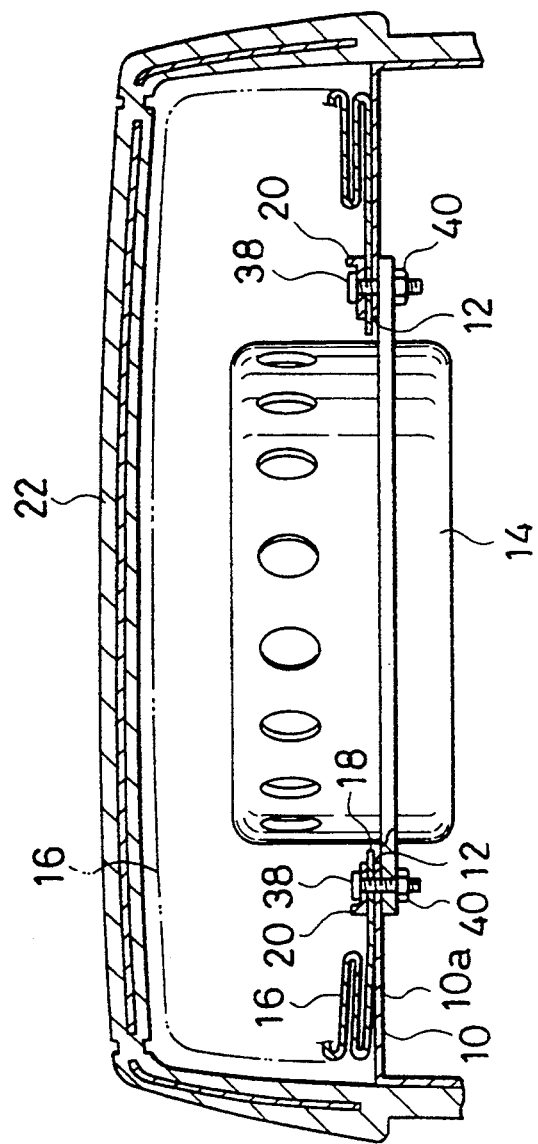
FIG. 10 is a longitudinal section showing an example of the air bag device of the prior art.

As shown in FIG. 9, the air bag device of this embodiment is also constructed by attaching both an inflator 46 and an air bag 50 to be extended by the inflator 46 to a main plate 44a of a retainer 44 and by covering the folded air bag 50 with a module cover 48.

Figure 1A:
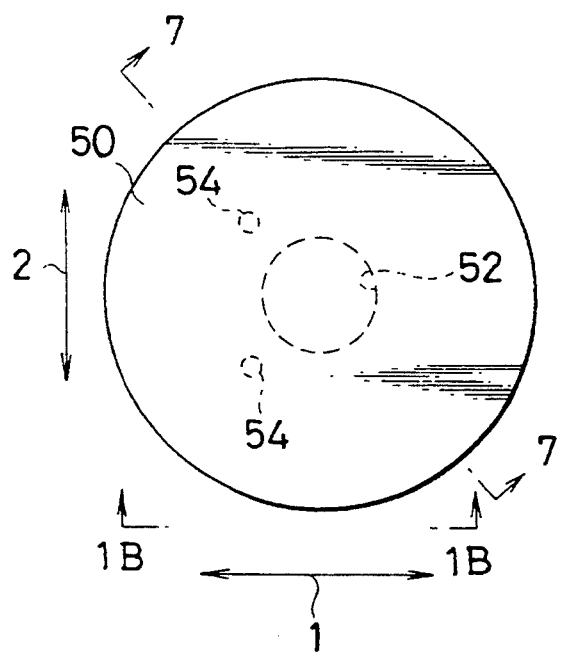
FIG. 1A is a plan view of an air bag.
Figure 1B:
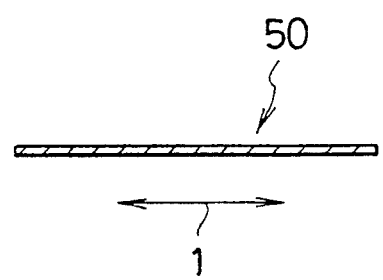
FIG. 1B is a side view of an air bag.
Figure 7:
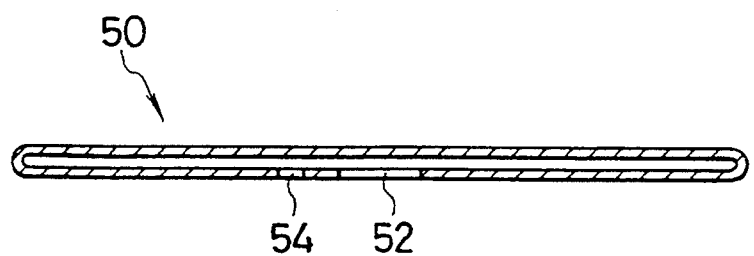
FIG. 7 is a section taken along line 7—7 of FIG. 1.

This air bag 50 takes a flattened disc shape, as shown in FIGS. 1A and 7, when it is not supplied with the gas, and is formed at the center of its back with an opening 52 for receiving the leading end of the inflator 46. The air bag 50 is formed with vent holes 54 for inhaling the air, when it is extended, and for releasing the gas from its inside, after extended, to absorb the shocks coming from the human body hitting the air bag 50.

Figure 2A:
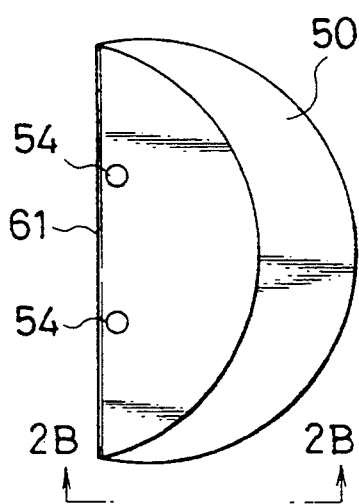
FIG. 2A is a plan view of the air bag being folded.
Figure 2B:
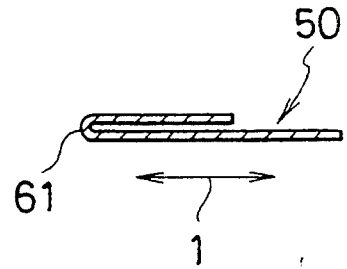
FIG. 2B is a side view of the air bag being folded.
Figure 3A:
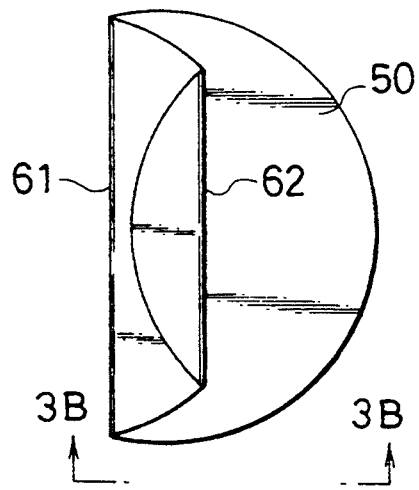
FIG. 3A is a plan view of the air bag being folded.
Figure 3B:
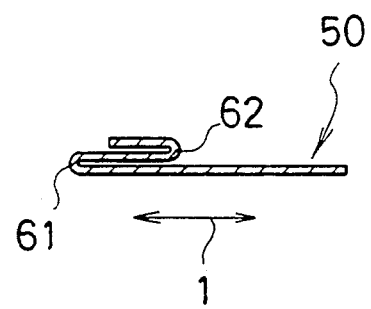
FIG. 3B is a side view of the air bag being folded.
Figure 4A:
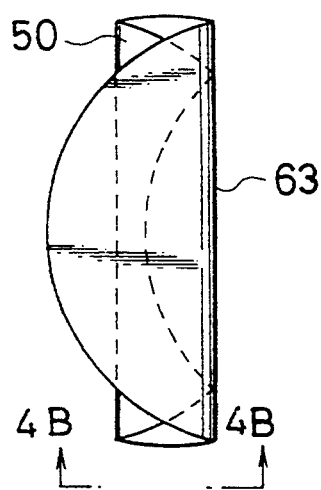
FIG. 4A is a plan view of the air bag being folded.
Figure 4B:
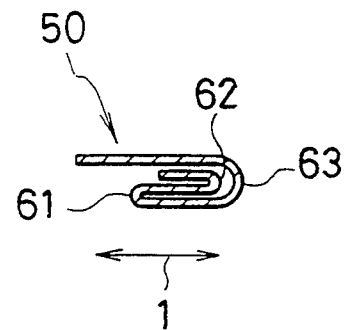
FIG. 4B is a side view of the air bag being folded.

The method of folding the air bag 50 will be described in the following with reference to FIGS. 1A to 6B. At first, as shown in FIGS. 2A and 2B, the air bag 50 has its lefthand half Folded to the front along a fold 61 slightly offset to the left from the center. As shown in FIGS. BA and BB, the folded half then has its leading end folded back along a fold 62 extending in parallel with the Fold 61. Then, as shown in FIGS. 4A and 4B, the remaining righthand half of the air bag 50 is folded back along a fold 88 which is slightly offset to the right from the center but in parallel with the fold 62, and, as shown in FIGS. 5A and 5B the folded leading end is further folded back along a fold 64 which is also in parallel with the fold 63.

Figure 5A:
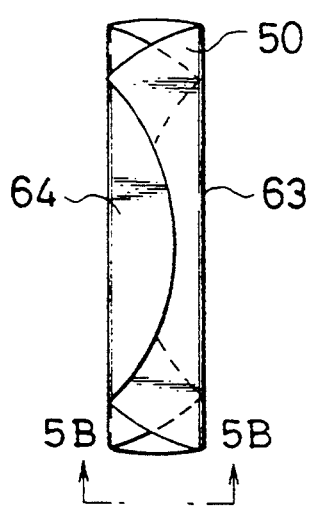
FIG. 5A is a plan view of the air bag being folded.
Figure 5B:
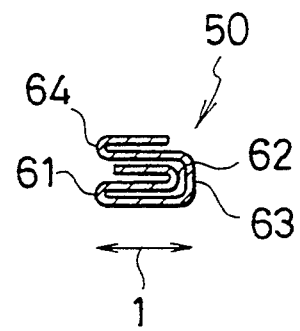
FIG. 5B is a side view of the air bag being folded.
Figure 6A:
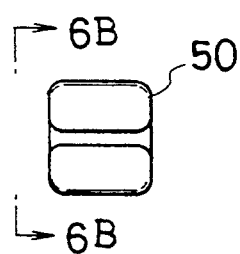
FIG. 6A is a plan view of the air bag folded up.
Figure 6B:
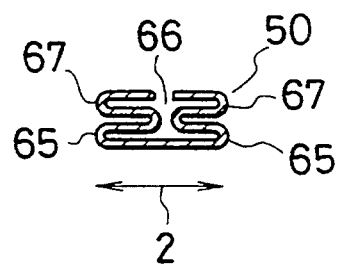
FIG. 6B is a side view of the air bag folded up.

In these ways, the air bag 50 is folded several times in a first direction 1 into a rectangular shape, as shown in FIG. 5A. After this, the rectangular air bag 50 is folded back in a zigzag manner along folds 65, 66 and 67 until it takes a generally square shape as shown in FIGS. 6A and 6B.

The air bag 50 thus folded is then covered with the module cover 48 so that the air bag system shown in FIG. 9 is prepared.

Figure 8:
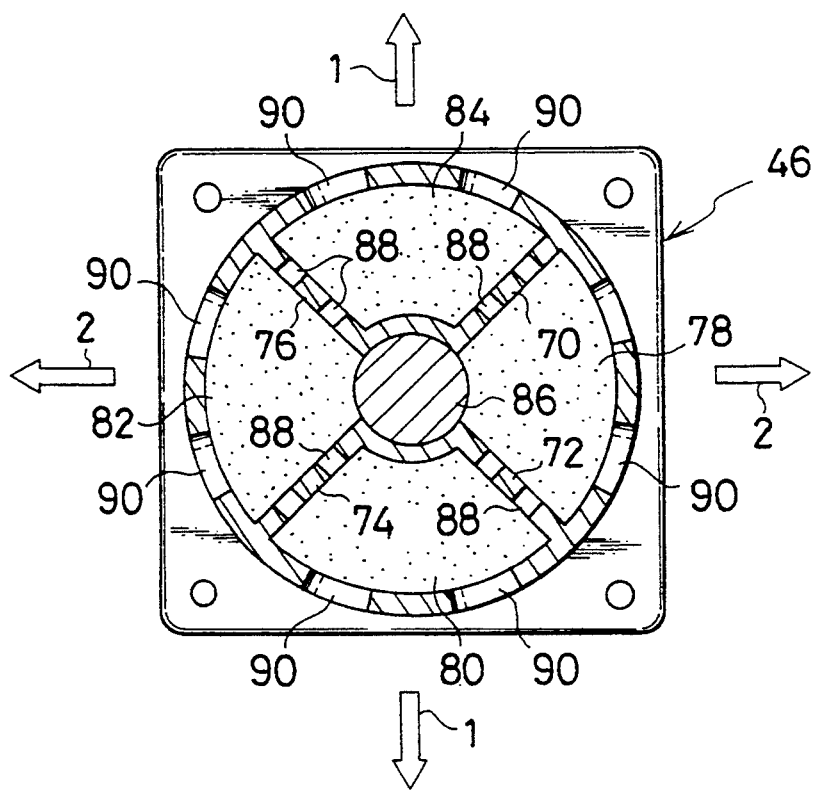
FIG. 8 is a transverse section showing an inflator 46.

As shown in FIG. 8, the inflator 46 has its inside divided by four radially extending partitions 70, 72, 74, 76 into four compartments 78, 80, 82 and 84. These compartments 78 to 84 are individually charged with gas generating agents. The inflator 46 is equipped at its center with an igniter 86, which is disposed to face the compartments 78 and 82 only. The partitions 70 to 76 are individually formed with openings 88 for allowing the gas produced by the reactions of the agents in the compartments 78 and 82 to be partially injected therethrough into the compartments 80 and 84 to cause the gas producing reactions of the agents in the compartments 80 and 84. Incidentally, the individual compartments 78 to 84 are formed with keyhole openings 90 for allowing the inside gases to flow therethrough into the air bag 50. These openings 90 are equipped along their inner faces with (not-shown) particulate trapping members made of mesh.

In the air bag device thus constructed, the gas is injected at first in a second direction 2 when the inflator 46 is activated. After lapse of a predetermined time, the gas is injected in the first direction 1. As a result, the air bag is unfolded or extended in the order of FIGS. 6B, 5B, 4B, 3B, 2B and 1B.

In this instance, the gas is injected at first in the second direction so that the air bag 50 is extended in the second direction. This second direction 2 is aligned with the direction, in which the gas is injected from the inflator 46, as shown in FIGS. 6B and 8, so that the injected gas pressure is substantially effective to function to extend the air bag 50 vertically of FIG. 5A.

After this first stage extension of the bag 50, the gas is injected in the first direction from the inflator 46. As a result, the air bag is further extended in the first direction 1, which is aligned with the horizontal direction of FIGS. 2B, 3B and 4B. Thus, the injected gas pressure in the first direction 1 from the inflator 46 is effective to function as a force to extend the air bag 50 in the horizontal direction of FIGS. 2B, 3B and 4B.

Thus, according to the air bag device of the present embodiment, the injected gas pressure of the inflator is substantially effective to act as the pressure for extending the air bag, so that the air bag can be abruptly extended along the main plate 44a of the retainer 44. Moreover, the air bag can be extended sufficiently quickly even if the inflator 46 has its capacity reduced.

As has been described hereinbefore, according to the air bag device of the present invention, the air bag can be quickly extended vertically and horizontally to protect the occupant sufficiently. Moreover, the injected gas pressure of the inflator effectively acts as the force to extend the air bag so that the air bag can be quickly extended even with a reduced inflator capacity.

What is claimed is:

1. An air bag device comprising,
   a retainer having a main plate and an inflator mounting opening formed in a central portion of the main plate,
   an inflator fixed to said retainer and having a leading end situated in the inflator mounting opening of said retainer, a side periphery, a plurality of gas injection ports formed in the side periphery, and means for injecting gas from the inflator into a second direction immediately after the inflator is activated and then in a first direction, said first direction extending along the main plate of the retainer and the second direction extending perpendicular to said first direction,
   an air bag fixed to the retainer and arranged on the retainer such that the air bag is folded along the first direction and then along the second direction, said air bag being inflated by the gas injected by the inflator, and
   a module cover attached to the retainer, said module cover covering the air bag and being torn by the air bag when the air bag is inflated.

2. An air bag device according to claim 1, wherein said inflator includes:
   a first compartment for injecting the gas in the first direction;
   a second compartment for injecting the gas in the second direction;
   gas producing agents fitted in said first and second compartments;
   an igniter for igniting the agent in said second compartment; and
   means for establishing communication between said second compartment and said first compartment to introduce the gas in said second compartment partially into said first compartment thereby to ignite the gas producing agent in said first compartment.

3. An air bag device according to claim 2, wherein said means for establishing communication is an opening formed in a partition partitioning said first compartment and said second compartment.

4. An air bag device according to claim 2, wherein said inflator further includes partitions to divide the first and second compartments, said first compartment being completely isolated from the igniter, and said second compartment communicating with the igniter.

5. An air bag device according to claim 1, wherein said air bag device is for a driver,
   said air bag has a circular shape when unfolded and uninflated, and
   said circular shape air bag in an uninflated condition includes a plurality of first straight folding lines extending perpendicular to the first direction, and a plurality of second straight folding lines extending perpendicular to the first straight folding lines, said circular shape air bag being folded along the first straight folding lines and then along the second straight folding lines when the air bag is assembled.

* * * * *